US006990290B2

(12) United States Patent
Kylberg et al.

(10) Patent No.: US 6,990,290 B2
(45) Date of Patent: Jan. 24, 2006

(54) DEVICE FOR THERMAL CYCLING

(75) Inventors: Gunnar Kylberg, Bromma (SE); Owe Salven, Uppsala (SE); Per Andersson, Uppsala (SE)

(73) Assignee: Gyros AB, Uppsala (SE)

( * ) Notice: Subject to any disclaimer, the term of this patent is extended or adjusted under 35 U.S.C. 154(b) by 69 days.

(21) Appl. No.: 10/432,107

(22) PCT Filed: Nov. 23, 2001

(86) PCT No.: PCT/SE01/02608

§ 371 (c)(1),
(2), (4) Date: Oct. 30, 2003

(87) PCT Pub. No.: WO02/41998

PCT Pub. Date: May 30, 2002

(65) Prior Publication Data

US 2004/0131345 A1 Jul. 8, 2004

(30) Foreign Application Priority Data

Nov. 23, 2000 (SE) .......................................... 0004297-8

(51) Int. Cl.
*A47J 31/00* (2006.01)

(52) U.S. Cl. ......................... 392/465; 422/186.2; 435/1

(58) Field of Classification Search ................. 392/465, 392/479; 435/1; 422/50, 58, 72, 82.12, 186.2
See application file for complete search history.

(56) References Cited

U.S. PATENT DOCUMENTS 6,063,589 A * 5/2000 Kellogg et al. ............... 435/24
6,548,788 B2 4/2003 Kellogg et al.

FOREIGN PATENT DOCUMENTS

| | | | |
|---|---|---|---|
| EP | 1 016 864 | A2 | 7/2000 |
| WO | WO-98/53311 | A2 | 11/1998 |
| WO | WO-00/67907 | A1 | 11/2000 |
| WO | WO-00/78455 | A1 | 12/2000 |
| WO | WO-01/46465 | A2 | 6/2001 |

* cited by examiner

*Primary Examiner*—Thor S. Campbell
(74) *Attorney, Agent, or Firm*—Fulbright & Jaworksi, L.L.P.

(57) ABSTRACT

An apparatus for performing temperature cycling, comprising a micro channel reactor structure (46, 48, 50), and having a heating structure (b1, b2, B1, B2) defining a desired temperature profile. A preferred embodiment of a heating element structure comprises a pattern of areas of a material capable of providing heat when energized, disposed over said micro channel reactor structure.

18 Claims, 11 Drawing Sheets

DEVICE FOR THERMAL CYCLING

The present invention relates to a device for the controlled thermal cycling of reactions, in particular in small channels that are present within a substrate. In particular the invention relates to a micro channel PCR reactor.

BACKGROUND OF THE INVENTION

There is a trend in the chemical and biochemical sciences towards miniaturization of systems for performing analytical tests and for carrying out synthetic reactions, where large numbers of reactions must be performed. For example in screening for new drugs as many as 100000 different compounds need to be tested for specificity by reacting with suitable reagents.

Another field is polynucleotide amplification, which has become a powerful tool in biochemical research and analysis, and the techniques therefor have been developed for numerous applications. One important development is the miniaturization of devices for this purpose, in order to be able to handle extremely small quantities of samples, and also in order to be able to carry out a large number of reactions simultaneously in a compact apparatus.

In most systems for the purposes indicated above (and others not mentioned) there would commonly be a need for heating the reagents in some stage of the procedure for carrying out the necessary reactions. Even more importantly there is also a need for maintaining the reaction temperature at a constant level during a desired period of time, i.e. to avoid variations in temperature across the channel part containing the reagents that have been heated.

Furthermore, in these miniaturized systems the temperature of the wall confining the sample will essentially determine the temperature of the sample. Thus, if the material constituting the wall leads away heat, there will be a temperature drop close to the wall, and a variation throughout the sample occurs.

There is also a problem with evaporation when heating small aliquots of liquids within micro channel structures. This problem can be solved by providing heating means in the form of a surface layer that is capable of absorbing light energy for transport into a selected area. See WO 0146465 (FIG. 7 and related disclosure). Conveniently white light is used, but for special purposes, monochromatic light (e.g. laser) can also be used. The layer can be a coating of a light-absorbing layer, e.g. a black paint, which converts the influx of light to heat.

An alternative solution to the evaporation problem has been to carry out the steps involving elevated temperature (heating steps) within closed reaction volumes. This has required solving problems related the large pressure increase that typically is at hand when heating liquid aliquots without venting. If the process concerned is integrated into a sequence of reactions there is a demand for smart valving solutions.

In many of the prior art devices the substrate material has had a fairly high thermal conductivity which has permitted heating by ambient air or by separate heating elements in close association with the inner wall of the channel containing a liquid to be heated. Cooling has typically utilized ambient air. Recently it has become popular to manufacture micro channel structures in plastic material that typically has a low thermal conductivity. Due to the poor thermal conductivity, unfavorable temperature gradients may easily be formed within the selected area when this latter type of materials is used. These gradients may occur across the surface and downwards into the substrate material. The variation in temperature may be as high as 10° C. or more between the center of the area or region and its peripheral portions. If the light absorbing area is too small this variation will be reflected in the temperature profile within a selected area and also within the heated liquid aliquot. For many chemical and biochemical reactions such lack of uniformity can be detrimental to the result, and indeed render the reaction difficult to carry out with an accurate result.

Although the heating means according to WO 0146465 eliminates the evaporation and the pressure problem, it still suffers from the above-mentioned temperature variation across the sample. Such temperature variations are often detrimental to the outcome of a reaction and must be avoided.

Microfluidic platforms that can be rotated comprising heating elements have been described in WO 0078455 and WO 9853311. These platforms are intended for carrying out reactions at elevated temperature, for instance thermal cycling.

SUMMARY OF THE INVENTION

In view of the shortcomings of prior art systems, it would be desirable to have access to a device for performing thermal cycling, and in particular PCR (Polymerase Chain Reaction) on small sample volumes. The objects of the invention are to provide a method and a device for temperature cycling of a liquid aliquot in a capillary of the dimensions given below, while minimizing the problems discussed above concerning uncontrolled evaporation and/or increase in pressure and/or to accomplish temperature levels that are at a constant level throughout the reaction volume during steps in which the reaction mixture is maintained at an elevated temperature (heating step). The capillary is preferably a part of a microfluidic device as defined below.

Such a device is provided according to the present invention and is defined in any of claims 1–15 and 17.

In the context of the invention the term "selected area" means the selected surface area to be heated plus the underlying part of the substrate containing the reactor volume of one or more micro channels if not otherwise being clear from the particular context. The selected area contains substantially no other essential parts of the micro channels. The term "surface" will refer to the surface to be heated, e.g. the surface collecting the heating irradiation, if not otherwise indicated.

By the terms "heating structure", "heating element structure" and "heating element" are meant a structure which is present in or on a selected area, or between the substrate and a radiation source, and which defines a pattern which (a) covers a selected area and (b) can be selectively heated by electromagnetic radiation or electricity, such as white or visible light or only IR, or by direct heating such as electricity. In this context the term "pattern" means (1) a continuous layer, or (2) a patterned layer comprising one or more distinct parts that are heated and one or more distinct parts that are not heated. (b) excludes that the pattern consists of only the part that is heated.

With the device according to the invention it is possible to carry out reactions such as DNA amplification e.g. by PCR in small volumes, which is advantageous in many respects. I.a. the reaction time can be reduced, very many samples can be processed at the same time on a compact device, and very minute volumes of sample can be handled.

By employing micro channels in the form of a U configuration to define the reactor volume according to an embodiment, another advantage is achieved, namely, it becomes possible to transfer the product of the PCR to further processing steps downstream of the reactor. This has not been possible in the known systems, where the PCR chamber has been the final processing step.

The terms "U-configuration" and "U-shaped" include shapes in which the channel structure comprises a downward bent with two arms directed more or less upward, for instance Y-shaped structures. If the channel structure is placed on a rotatable disc the downward bent is directed outward and the two upwardly directed arms more or less inwards towards the center of the disc. In case of Y-shaped structures, the downward arm has a valve function that is closed while thermal cycling is carried out on the liquid aliquot present in the downward bent.

When the thermal cycling is finalized the reaction mixture/reaction product can be transferred further downstream into the channel structure. When the cycling space is part of a U-configuration the transfer can be via one of the upward arms, or via the downward arm if the configuration is Y-shaped. In the first case the reaction product is displaced by a second liquid aliquot and in the second case by overcoming the valve function in lower arm of the Y. If the channel structure is placed on rotatable disc the driving force can be applied as described in WO 01/46465.

The same advantage is obtained if, as in a further embodiment, the channel structure comprises a straight channel, but is provided with a valve device on the downstream side.

By leaving the upward arms in communication with ambient air and arrange for proper cooling in the arms the problem of undesired evaporation and over pressure will be overcome.

The invention will now be described in detail with reference to the attached drawings.

DETAILED DESCRIPTION OF THE INVENTION

Figure 1A:
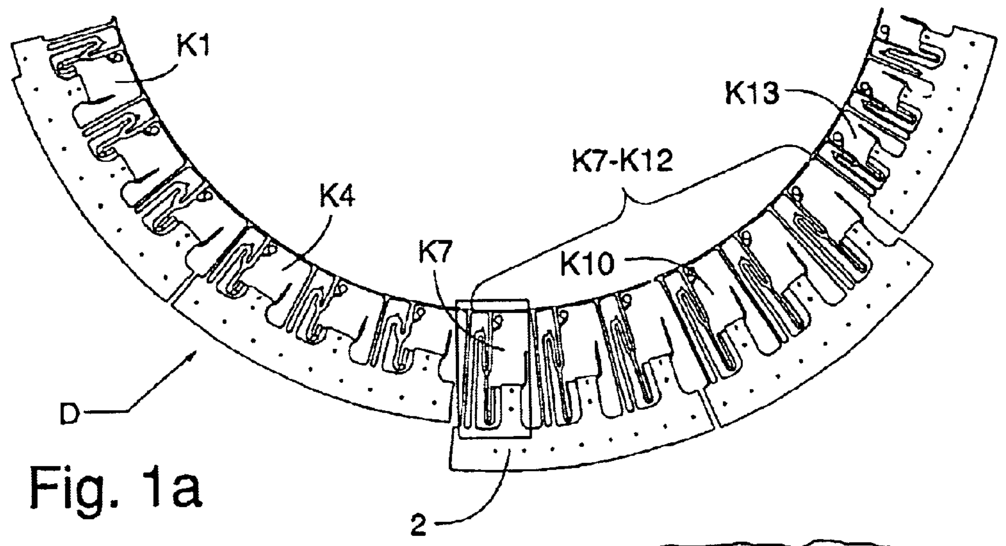
FIGS. 1*a–d* illustrates a prior art microfluidic disc.
Figure 1B:
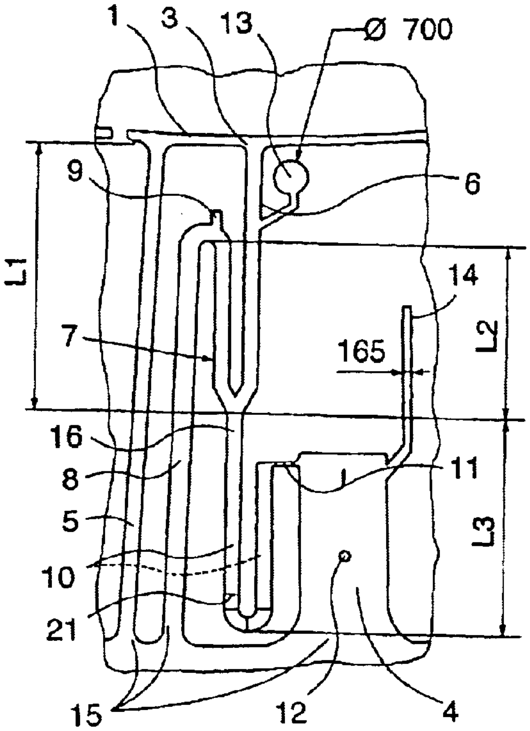
Figure 1C:
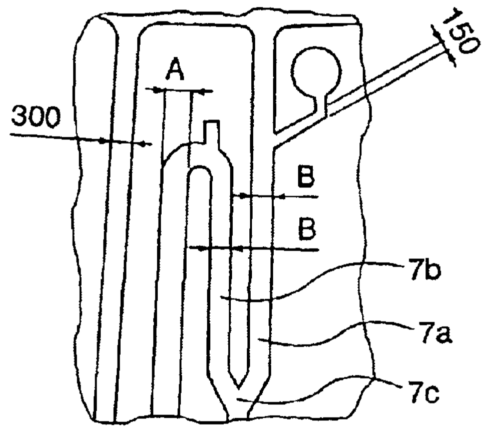
Figure 1D:
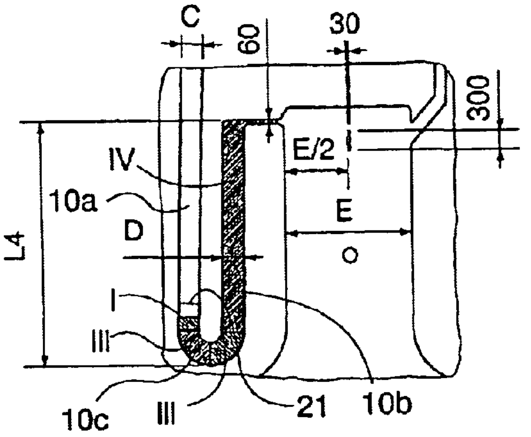

For the purpose of this application the term "micro channel structure" as used herein shall be taken to mean one or more channels, optionally connecting to one or more enlarged portions forming chambers having a larger width than the channels themselves. The micro channel structure is provided beneath the surface of a flat substrate, e.g. a disc member.

The terms "micro format", "micro channel" etc contemplate that the micro channel structure comprises one or more chambers/cavities and/or channels that have a depth and/or a width that is $\leqq 10^3$ μm, preferably $\leqq 10^2$ μm. The volumes of micro cavities/micro chambers are typically ≦1000 nl, such as ≦500 nl or ≦100 nl or ≦50 nl. Chambers/cavities directly connected to inlet ports may be considerably larger, e.g. when they are intended for application of sample and/or washing liquids.

In the preferred variants volumes of the liquid aliquots used are very small, e.g. in the nanoliter range or smaller (≦1000 nl). This means that the spaces in which reactions, detections etc are going to take place often becomes more or less geometrically indistinguishable from the surrounding parts of a micro channel.

A reactor volume is the part of a micro channel in which the liquid aliquot to be heated is retained during a reaction at an elevated temperature. Typically reaction sequences requiring thermal cycling or otherwise elevated temperature take place in the reaction volume.

The disc preferably is rotatable by which is meant that it has an axis of symmetry ($C_n$) perpendicular to the disc surface. n is an integer 3, 4, 5, 6 or larger. The preferred discs are circular, i.e. n=∞. A disc may comprise ≧10 such as ≧50 or ≧100 or ≧200 micro channels, each of which comprising a cavity for thermo cycling. In case of discs that can rotate, the micro channels may be arranged in one or more annular zones such that in each zone the cavities for thermo cycling are at the same radial distance.

By the expressions "essentially uniform temperature profile" and "constant temperature" are meant that temperature variations within a selected area of the substrate are within such limits that a desired temperature sensitive reaction can be carried out without undue disturbances, and that a reproducible result is achievable. This typically means that within the reaction volume, the temperature varies at most 50%, such as at most 25% or at most 10% or 5% of the maximum temperature difference between the opposing surfaces of the selected area comprising the heated liquid aliquot. These permitted variations apply across a plane that is parallel to the surface and/or along the depth of the micro channel. The acceptable temperature variation may vary from one kind of reaction to another, although it is believed that the acceptable variation normally is within 10° C., such as within 5° C. or within 1° C.

The present invention suitably is implemented with micro channel structures for a rotating microfluidic disc of the kind, but not limited thereto, disclosed in WO 0146465, and in FIG. 1 in the present application, there is shown a device according to said application. However, it is to be noted that this is only an example and that the present invention is not limited to use of such micro channel structures.

The micro channel structures K7–K12 according to this known device, shown in FIGS. 1*a–d,* are arranged radially on a microfluidic disc D. Suitably the microfluidic disc is of a one- or two-piece moulded construction and is formed of an optionally transparent plastic or polymeric material by means of separate mouldings which are assembled together (e.g. by heating) to provide a closed unit with openings at defined positions to allow loading of the device with liquids and removal of liquid samples. See for instance WO 0154810 (Gyros AB). Suitable plastic of polymeric materials may be selected to have hydrophobic properties. In the alternative, the surface of the microchannels may be additionally selectively modified by chemical or physical means to alter the surface properties so as to produce localised regions of hydrophobicity or hydrophilicity within the microchannels to confer a desired property. Preferred plastics are selected from polymers with a charged surface, suitably chemically or ion-plasma treated polystyrene, polycarbonate or other transparent polymers and non-transparent polymers (plastic materials). The term "rigid" in this context includes that discs produced from the polymers are flexible in the sense that they can be bent to a certain extent. Preferred plastic materials are selected from polystyrenes and polycarbonates. In case the process taking place within the micro channel structure requires optical measurement, for instance of fluorescence, the preferred plastic materials are based on monomers only containing saturated hydrocarbon groups and polymerisable unsaturated hydrocarbon groups, for instance Zeonex® and Zeonor®. Preferred ways of modifying the plastics by plasma and and by hydrophilization are given in WO 0147637 (Gyros AB) and WO 0056808 (Gyros AB).

The microchannels may be formed by micro-machining methods in which the micro-channels are micro-machined into the surface of the disc, and a cover plate, for example, a plastic film is adhered to the surface so as to close the channels. Another method that is possible is injection molding. The typical microfluidic disc D has a thickness which is much less than its diameter and is intended to be rotated around a central hole so that centrifugal force causes fluid arranged in the microchannels in the disc to flow towards the outer periphery of the disc. In the embodiment of the present invention shown in FIGS. 1_a_–1_d_, the microchannels start from a common, annular inner application channel 1 and end in common, annular outer waste channel 2, substantially concentric with channel 1. It is also possible to have individual application channels (waste channels for each microchannel or a group of microchannels). Each inlet opening 3 of the microchannel structures K7–K12 may be used as an application area for reagents and samples. Each microchannel structure K7–K12 is provided with a waste chamber 4 that opens into the outer waste channel 2. Each microchannel K7–K12 forms a U-shaped volume defining configuration 7 and a U-shaped chamber 10 between its inlet opening 3 and the waste chamber 4. The normal desired flow direction is from the inlet opening 33 to the waste chamber 4 via the U-shaped volume-defining configuration 7 and the U-shaped chamber 10. Flow can be driven by capillary action, pressure, vacuum and centrifugal force, i.e. by spinning the disc. As explained later, hydrophobic breaks can also be used to control the flow. Radially extending waste channels 5, which directly connect the annular inner channel 1 with the annular outer waste channel 2, in order to remove an excess fluid added to the inner channel 1, are also shown.

Thus, liquid can flow from the inlet opening 3 via an entrance port 6 into a volume defining configuration 7 and from there into a first arm of a U-shaped chamber 10. The volume-defining configuration 7 is connected to a waste outlet for removing excess liquid, for example, radially extending waste channel 8 which waste channel 8 is preferably connected to the annular outer waste channel 2. The waste channel 8 preferably has a vent 9 that opens into open air via the top surface of the disk. Vent 9 is situated at the part of the waste channel 8 that is closest to the centre of the disc and prevents fluid in the waste channel 8 from being sucked back into the volume-defining configuration 7.

The chamber 10 has a first, inlet arm 10_a_ connected at its lower end to a base 10_c_, which is also connected to the lower end of a second, outlet arm 10_b_. The chamber 10 may have sections I, II, III, IV which have different depths, for example each section could be shallower than the preceding section in the direction towards the outlet end, or alternatively sections I and III could be shallower than sections II and IV, or vice versa. A restricted waste outlet 11, i.e. a narrow waste channel is provided between the chamber 10 and the waste chamber 4. This makes the resistance to liquid flow through the chamber 10 greater than the resistance to liquid flow through the path that goes through volume-defining configuration 7 and waste channel 8.

By introducing a well defined volume of sample that will just about fill one U shaped volume of this configuration, it will be possible to confine this sample within the portion of the micro channel structure that is defined by said U, by spinning the disc, and thus impose a simulated gravity. If the spinning speed is sufficient, the force imposed will counteract the tendency of the sample to evaporate if heated. If heating is applied locally and the material of the disc has a low thermal conductivity, for instance plastics, a steep decreasing temperature gradient will form between the heated and non-heated area. The upper part of the arms will act as a cooler and assist in counteracting evaporation. The need for securing evaporation losses by closing the system can be avoided. Thus, in fact the U shaped volume will be an effective reaction chamber for the purpose of thermal cycling, e.g. for performing polynucleotide amplification by thermal cycling.

However, it is equally possible to use a micro channel structure without the above discussed U-configuration, namely by employing a straight, radially extending channel, but provided with a stop valve at the end closest to the disc circumference. A valve suitable for this purpose is disclosed in WO 0102737 (Gyros AB), the disclosure of which is incorporated herein in its entirety. Such a valve operates by using a plug of a material that is capable of changing its volume in response to some external stimulus, such as light, heat, radiation, magnetism etc. Thus, by introducing a sample in a capillary at a desired location, sealing the capillary at the outermost end position of the sample, and spinning the disc, the sample will be held in place, and uncontrolled evaporation during heating can be controlled in the same way as in the embodiment employing a U-configuration.

Another way of providing a valve or stop for preventing the sample from evaporating and moving in the channels during temperature cycling or simple heating, is to provide a minute amount of metal having low melting temperature, such as Woods metal or similar types of metal, having melting points in the relevant region. Another possible type of material is wax. It should of course not melt at the temperature prevailing during the reaction, but at a slightly higher level, say 100° C., if the reaction temperature is 95° C. Such metals are well known to the skilled man, and are easily adapted to the situation at hand without undue experimentation.

Also mechanical valves can be used in the variants mentioned above.

However, as indicated above, it is essential that a uniform temperature level can be maintained locally in the entire reaction volume preferably with a steep temperature gradient to the non-heated parts of the microfluidic substrate. Such controlled heating is conveniently performed by a contact heating system and method disclosed herein, embodiments of which will now be described in detail below. The heating system referred to in this paragraph may be based on contact heating or non-contact heating.

Figure 2A:
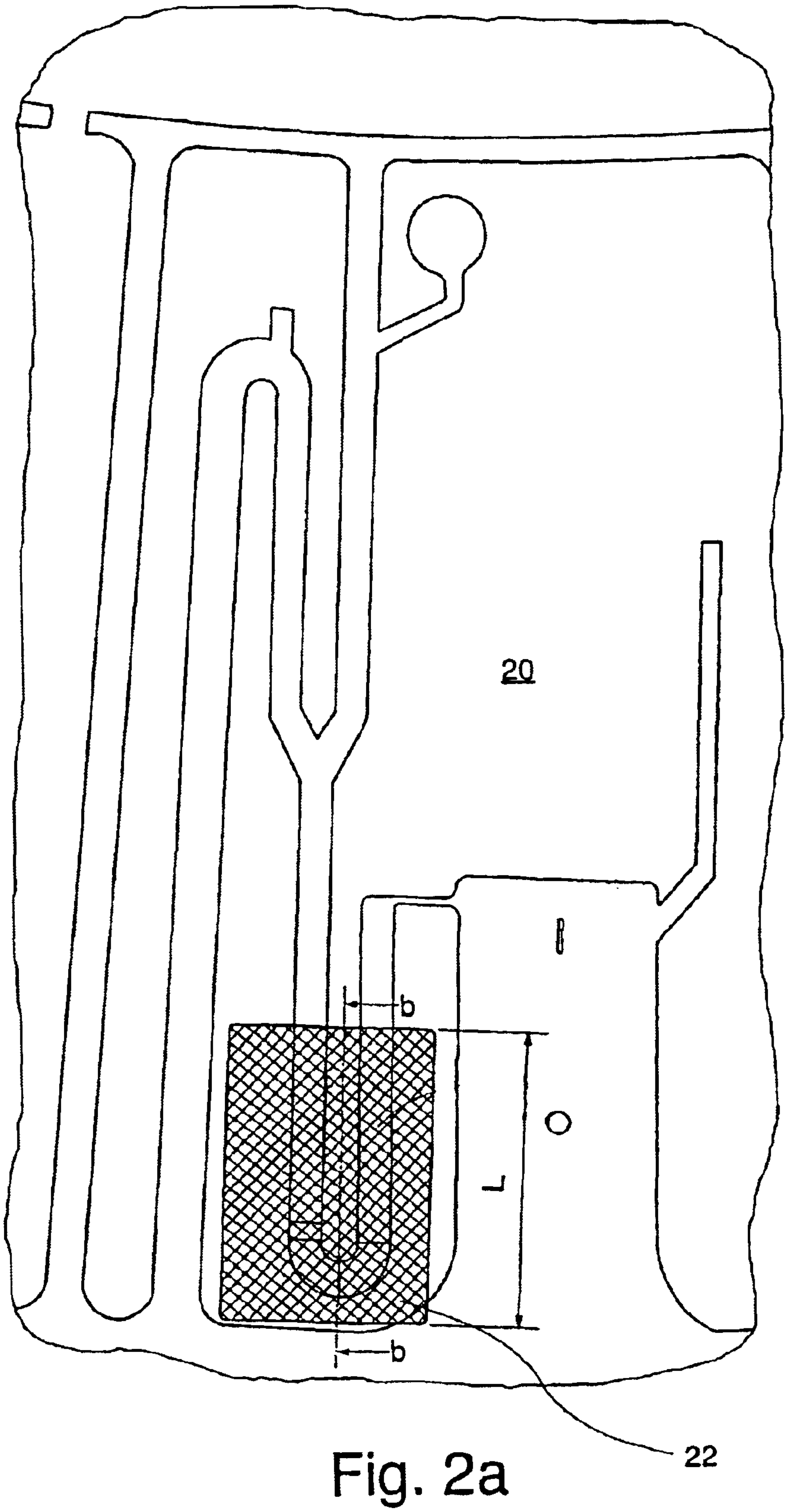
FIGS. 2*a–b* illustrates a prior art device with (a) a heating structure and (b) a temperature profile across the selected area during heating.
Figure 2B:
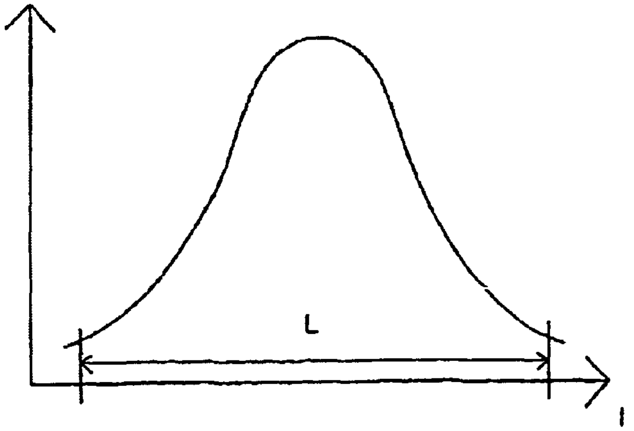

FIG. 2*a* shows a micro channel structure having a U configuration 20 provided on a microfluidic disc of the type discussed previously, which is covered by a light absorbing area 22 for the purpose of heating. FIG. 2*b* shows a temperature profile across said light absorbing area along the indicated centerline b—b, when it is illuminated with white light. As can be clearly seen, the temperature profile is bell shaped, which unavoidably will cause uneven heating within the region where the channel structure is provided, thus causing the chemical reactions to run differently in said channel structure at different points.

It would be possible to enlarge the area such that its periphery is located sufficiently remote from the channel structure that the bell shaped temperature profile is "flattened" out to an extent that there will be a more uniform temperature across the part to be heated of the channel structure. However, in the first place this would require too much surface around the channel structure to be covered by the light-absorbing layer, and since there is a desire to provide a very large number of channel structures close to each other, an enlarged area would occupy too much surface. Secondly, even if a very large area is provided the temperature profile would still exhibit a more or less clear bell shape, indicating non-uniform temperature over the channel structure defining the reaction volume.

Figure 3A:
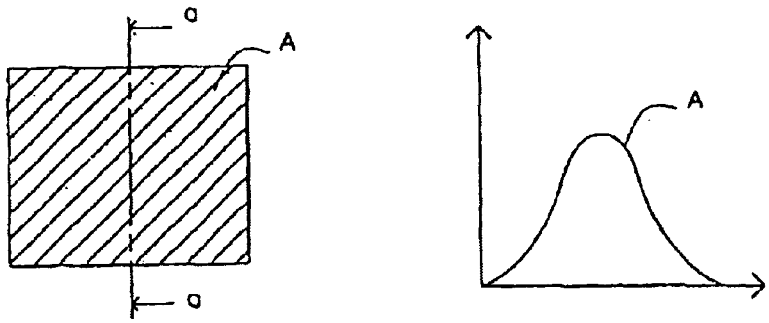
FIGS. 3*a–b* illustrates (a) a prior art surface temperature profile and (b) a desired surface temperature profile according to the invention, and a typical temperature profile between the opposing surfaces of a selected area made of plastic material.
Figure 3B:
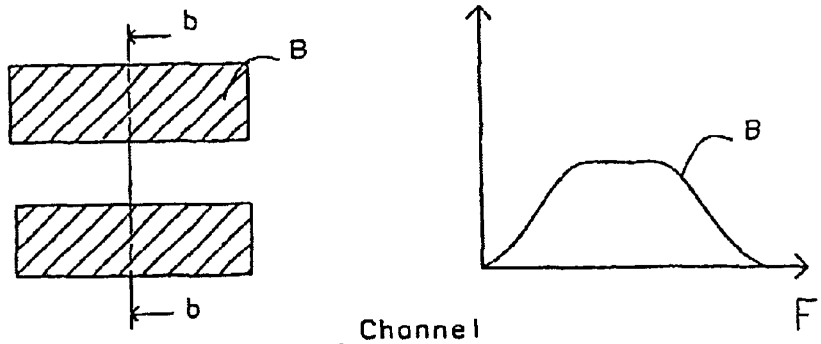
Figure 3C:
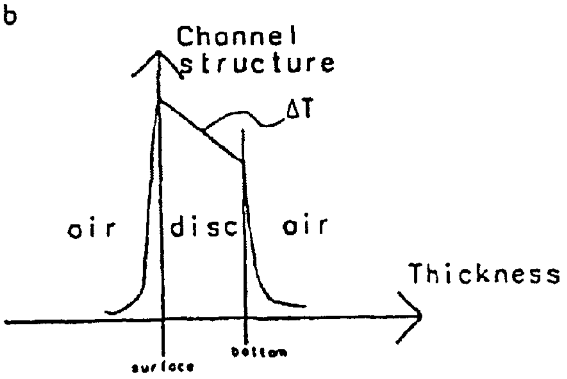

In essence, it all comes down to enabling heating of a local area of a substrate containing a micro channel/chamber structure, in a controlled way, so as to achieve a uniform heating across the volume containing the liquid aliquot to be heated. This should be achieved at the same time as surrounding elements should be as little affected as possible by the heating, i.e. preferably, areas immediately adjacent the heated region, e.g. another part of the micro channel structure, should not be heated at all, in the ideal situation. It is of course desirable that the temperature is equal throughout the entire volume. In the case of the present invention implemented in small micro channels and heating at the surface closest to the microchannel, the heating method and heating element structure, primarily ensures a uniform temperature level in the sense as defined above to be achieved across the surface of a selected area of a substrate where the part(s) to be heated of the micro channel (s) is(are) located. The factual variations that may be at hand in the surface becomes smaller in any plane inside the selected area. The plane referred to is parallel with the surface. However, there will be a relatively large temperature drop through the thickness of the disc. This drop typically is of the order of 10° C. In spite of this, because the channel dimensions are so small, only about 1/10 of the thickness of the substrate, the temperature drop over the channel in this direction will be only about 1° C., which is acceptable for all practical purposes. This is illustrated in FIG. 3*c*. This relatively large temperature drop along the thickness of the substrate will assist in an efficient and rapid cooling of the heated liquid aliquot after a heating step. This becomes particularly important if the process performed comprises repetitive heating and cooling (thermal cycling) of the liquid aliquot. Cooling will be assisted by spinning the disc.

When a disc is rotated, the frictional forces will drag air at the surface of the disc. Thus, the air near the disc will rotate in the same direction as the disc. The rotation of the air will result in centrifugal forces that will cause the air to flow radially.

The flowing air will have a cooling effect on the surface of the disc, and in fact it is possible to control the rate of cooling very accurately by controlling the speed of rotation, given that the air temperature is known. This effect is utilized in the present invention, and is a key factor for the success of the heating method and system according to the invention.

It would be possible to obtain the same effect if one uses controlled air flow from a fan or the like, where the cooling effect can be varied by varying the speed of the fan. This method could be used for stationary systems where the regions, e.g. comprising micro channels to be cooled, to be cooled are made in e.g. a flat substrate which is non-rotary.

Most plastic materials, in particular transparent plastic materials are non-absorbing with respect to visible light but not to infrared. For microfluidic discs, which are normally made of transparent polymeric materials, illumination with visible light will cause only moderate heating (if any at all), since most of the energy is not absorbed. One possibility to convert visible light to heat a defined area or volume (selected area) is to apply a light absorbing material at the location where heating is desired.

Thus, in order to transform light to heat light-absorbing material must be provided at the position where heating is desired. This can conveniently be achieved by covering the position or region with e.g. black color by printing or painting. Between the various spots of light absorbing material there may be a material reflecting the irradiation used. An alternative for the same kind of substrates is to cover one of the substrate surfaces with a light absorbing material and illuminating this surface through a mask only permitting light to pass through holes in the mask that are aligned with the selected areas.

For substrates made in plastic material that absorbs the radiation used, the surface may be coated with a mask that reflects the radiation everywhere except for the selected areas. Alternative the mask may be physically separated from the substrate but still positioned between the surface of the substrate and the irradiation source.

Therefore, the area is given a specific lay-out that changes the temperature profile, from a bell shape to (ideally) an approximate "rectangular" shape, i.e. making the temperature variation uniform across the surface of the selected area or across a plane parallel thereto. One method is by a simple trial end error approach. For non-absorbing materials a pattern of material absorbing the radiation used is placed between the surface of the substrate and the source of radiation. Typical the material is deposited on the substrate. By using an IR video camera, the temperature at the surface can be monitored. Another method for arriving at said lay-out is by employing FEM calculations (Finite Element Method), and will be discussed in further detail below. FIG. 3 illustrates schematically the change in profile principally achievable by employing the inventive idea. The bell shaped profile A results with a light absorbing area A having the general extension as shown FIG. 3*a,* (the profile taken in the cross section indicated by the arrow a), and the "rectangular" profile results when employing a light absorbing region as shown by curve B in FIG. 3 (the profile taken in the cross section indicated by the arrow).

The most important feature of the temperature profile is that its upper (top) portion is flattened (uniform), thus implying a low variation in temperature across the corresponding part of the selected area. The "flanks", i.e. the side portions of the profile will always exhibit a slope, but by suitable measures this slope can be controlled to the extent that the profile better will approximate an ideal rectangular shape.

Now various embodiments of the heating system and different aspects thereof will be described with reference to the drawings.

In a first embodiment of the invention, electromagnetic radiation, for instance light, is used for heating a liquid present in a selected area of a substrate made of a plastic material not absorbing the radiation used for heating. In this case a surface of the selected area is covered/coated with a layer absorbing the radiation energy, e.g. light. As outlined in this specification the kind of radiation, plastic material and absorbing layer must match each other. The layer may be a black paint. The paint is laid out in a pattern of absorbing and non-absorbing (coated and non-coated) parts (subareas) on the surface of the selected areas. The term "non-absorbing part" includes covering with a material reflecting the radiation. In other variants of this embodiment, the layer absorbing the irradiation is typically within the substrate containing the micro channel. In the case quick and/or relatively high increase in temperature is needed, the distance between the layer absorbing the irradiation used and reactor volume at most the same as the shortest distance between the reactor volume and the surface of the substrate. A relatively high increase in temperature means up to below the boiling point of water, for instance in the interval 90–97° C. and/or an increase of 40–50° C. The absorbing layer may also located to the the inner wall of the reactor volume.

The first embodiment also includes a variant in which the substrate is made of plastic material that can absorb the electromagnetic radiation used. In this case a reflective material containing patterns of non-absorbing material including perforations is placed between the surface of the selected areas and the source of radiation. This includes that the reflective material for instance is coated or imprinted on the surface of the substrate. Non-adsorbing patterns, for instance patterns of perforation, are selectively aligned with the surfaces of the selected areas. This variant may be less preferred because absorption of irradiation energy will be essentially equal throughout the selected area that may counteract quick cooling.

By the term "absorbing plastic material" is meant a plastic material that can be significantly and quickly heated by the electromagnetic radiation used. The term "non-adsorbing plastic material" means plastic material that is not significantly heated by the electromagnetic radiation used for heating.

The term "pattern" above means the distribution of both absorbing and non-absorbing parts (subareas) across a layer of the selected area, for instance a surface layer. The term excludes variants where the pattern only comprises one absorbing part covering completely the surface of the selected area.

The invention will now be illustrated by different patterns of absorbing materials coated on substrates made of non-absorbing plastic material. For substrates made of absorbing plastic material, similar patterns apply but the non-absorbing parts are replaced with a reflective material and the absorbing parts are typically uncovered.

As a first example let us consider a micro channel/chamber structure, a few examples of which are indicated in FIGS. 4*a–e*. This kind of channel/chamber structures can be provided in a large number, e.g. 400, on a microfluidic disc 40 (schematically shown in FIG. 5*a*). All structures need not be identical, but in most cases they will be, for the purpose of carrying out a large number of similar reactions at the same time. If we assume that all channel/chamber structures are identical, and that only one portion (e.g. a reaction chamber or a segment of a channel) of the channel/chamber structure needs to be heated during the operation, it will be convenient to provide the inventive heating element structure, e.g. as in FIG. 3*b*, as concentric bands of paint 42, 44, as shown in FIG. 5*b*, or some other kind of absorbing material.

Figure 6A:
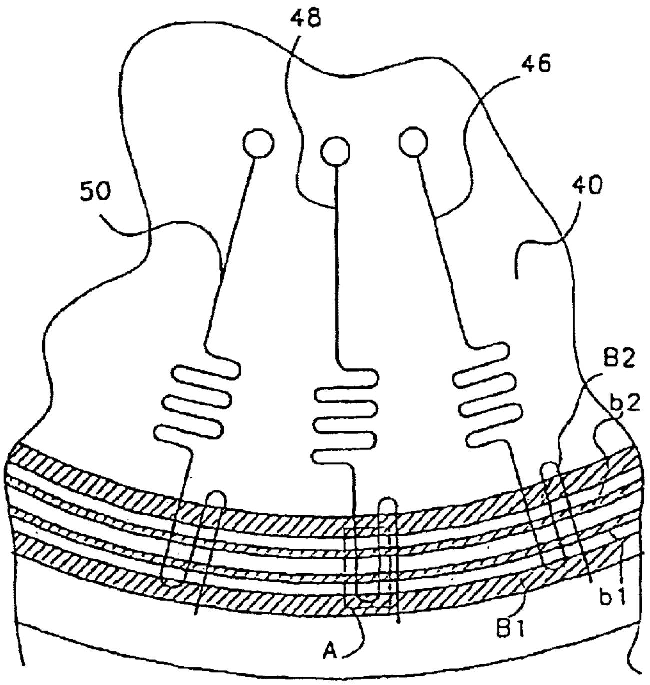
FIGS. 6*a–b* illustrates another type of heating element structure and the obtainable temperature profile.
Figure 6B:
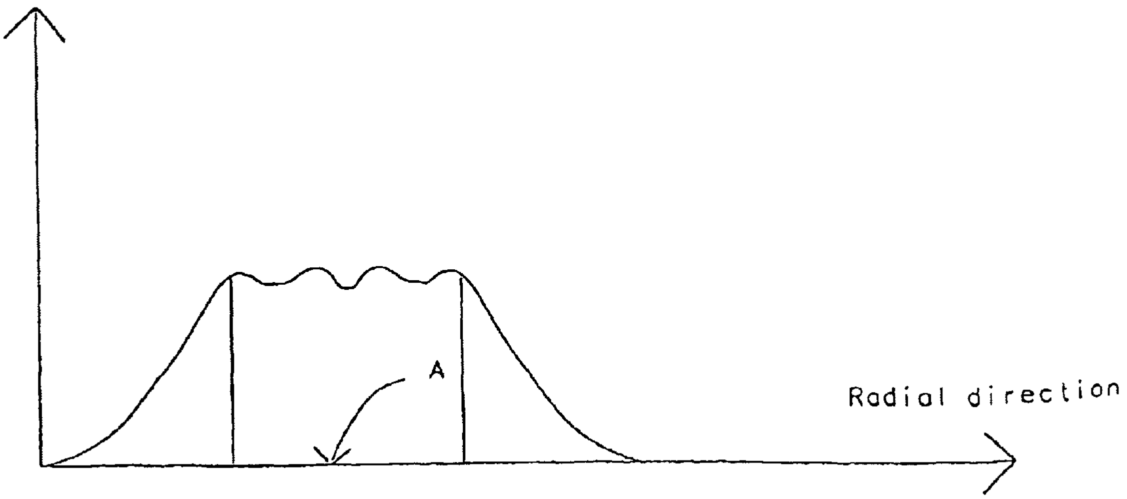

The provision of this basic band configuration is not an optimal solution, however, since the temperature profile still exhibits a slight fluctuation over the area to be heated. In a preferred embodiment therefore, there is provided several narrow bands b1, b2 of light absorbing material (paint) between the larger bands B1, B2, as schematically shown in FIG. 6*a*, which shows a broken away view of a disc 40 having a plurality of channel structures 46, 48, 50. In FIG. 6*b* the corresponding temperature profile achievable with this band configuration is shown. In this example it is the part of the micro channel structure delimited by the square A (FIG. 6*a*) that it is desired to heat in a controlled manner.

Figure 4:
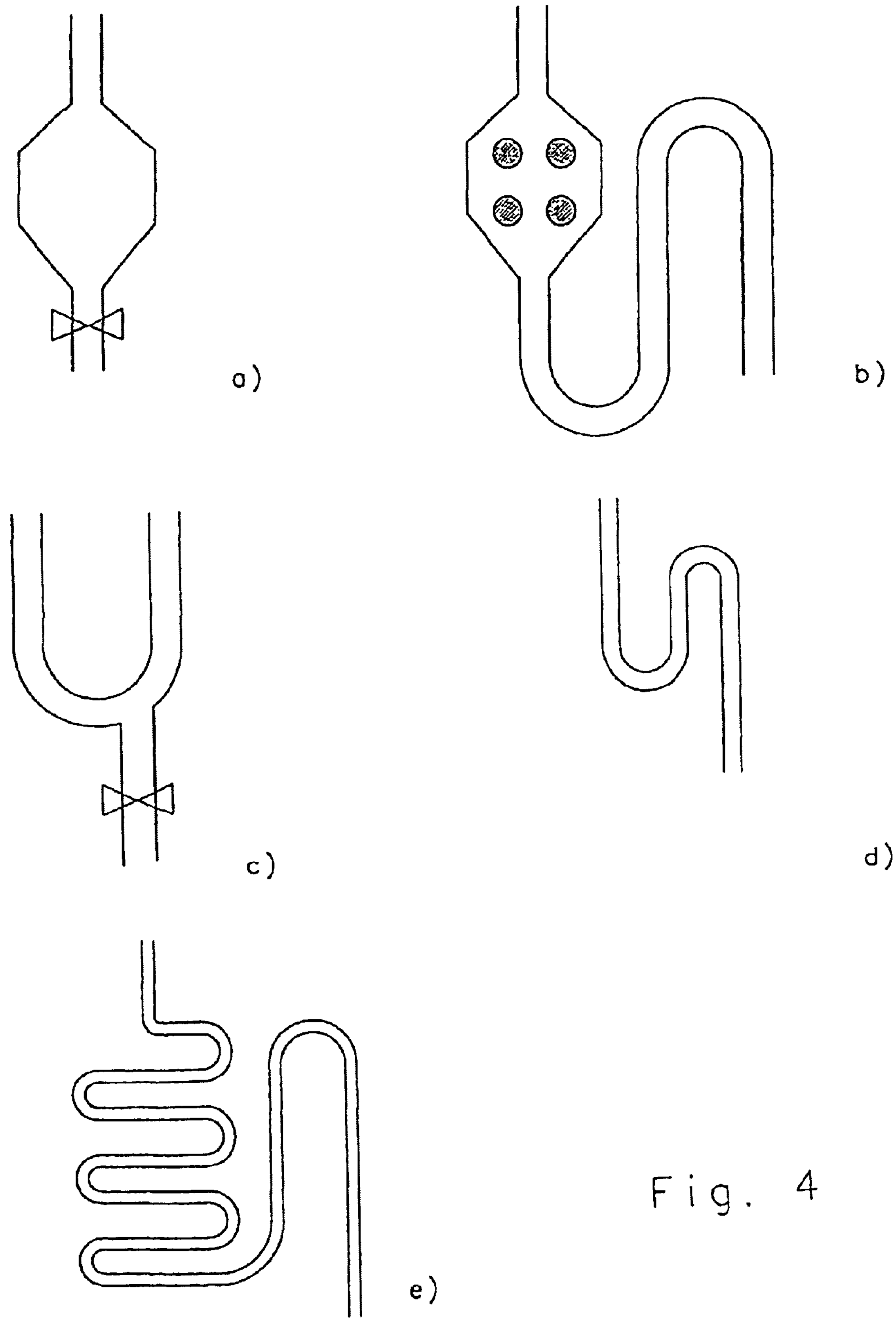
FIGS. 4*a–e* exemplifies various micro channel structures to which the invention is applicable.
Figure 5A:
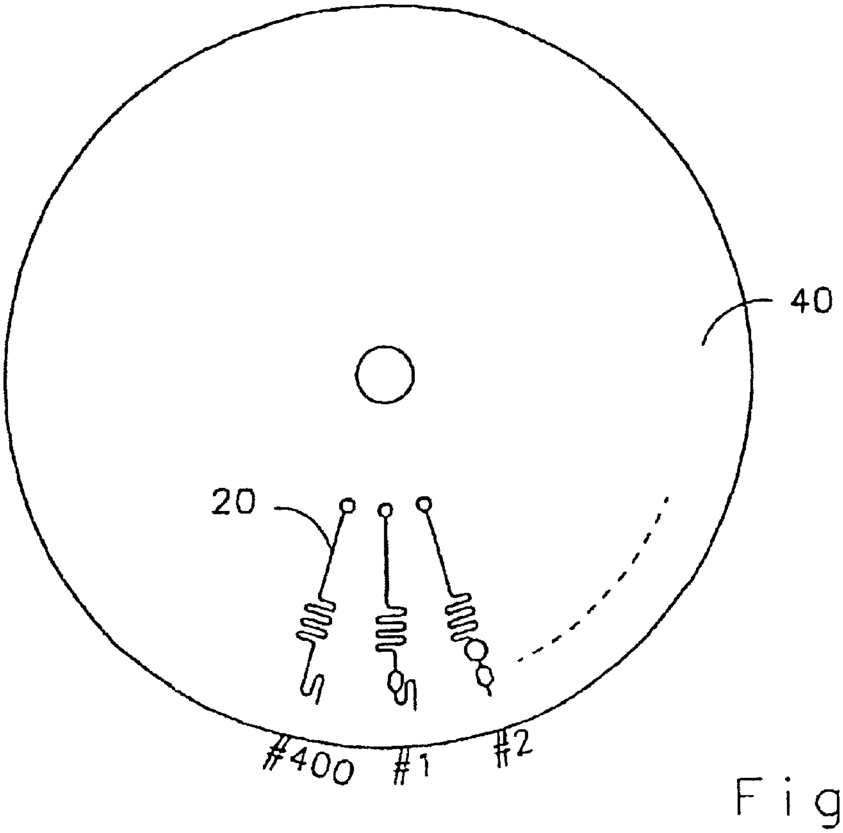
FIGS. 5*a–b* illustrates a microfluidic disc having a heating element structure.
Figure 5B:
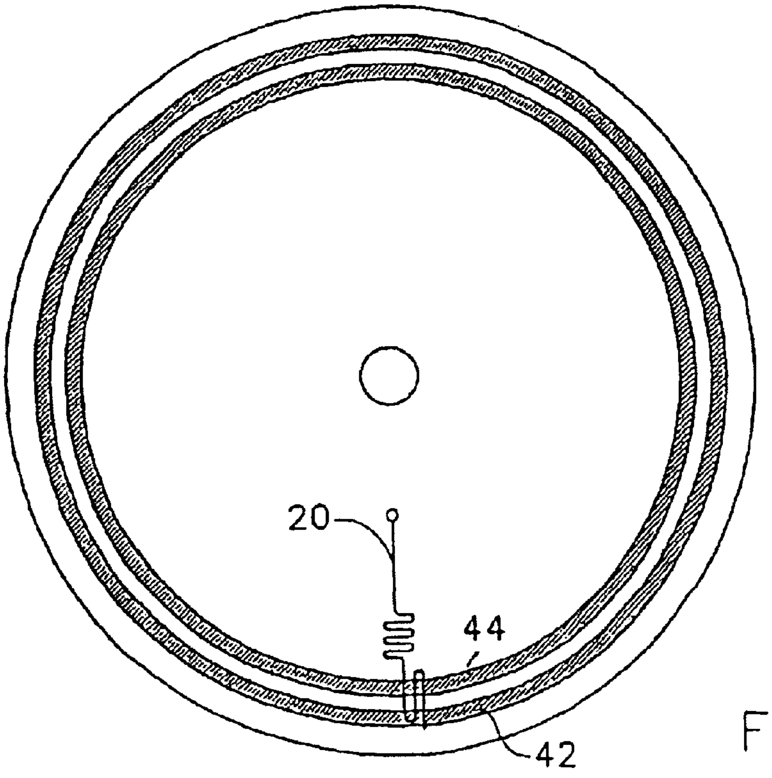

The heating element structure described above is applicable to all channel/chamber structures shown in FIG. 4.

However, for certain applications it can be desirable to provide even more localized heating, e.g. of a circular or rectangular/square area. This would especially be required if adjacent or surrounding areas must not be heated at all. The embodiment with concentric bands of paint will result in heating also of the areas between the radially extending micro channel/chamber structures.

Figure 7A:
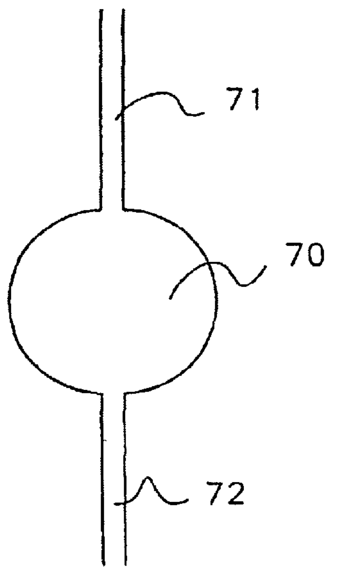
FIGS. 7*a–c* illustrates still another embodiment of a reactor system and a heating element structure therefor, and the obtainable temperature profile.
Figure 7B:
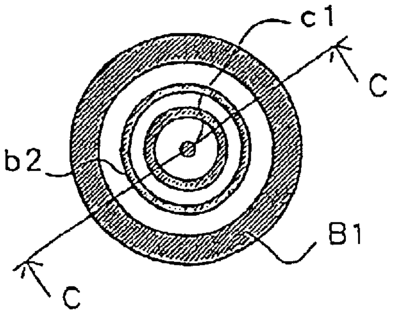
Figure 7C:
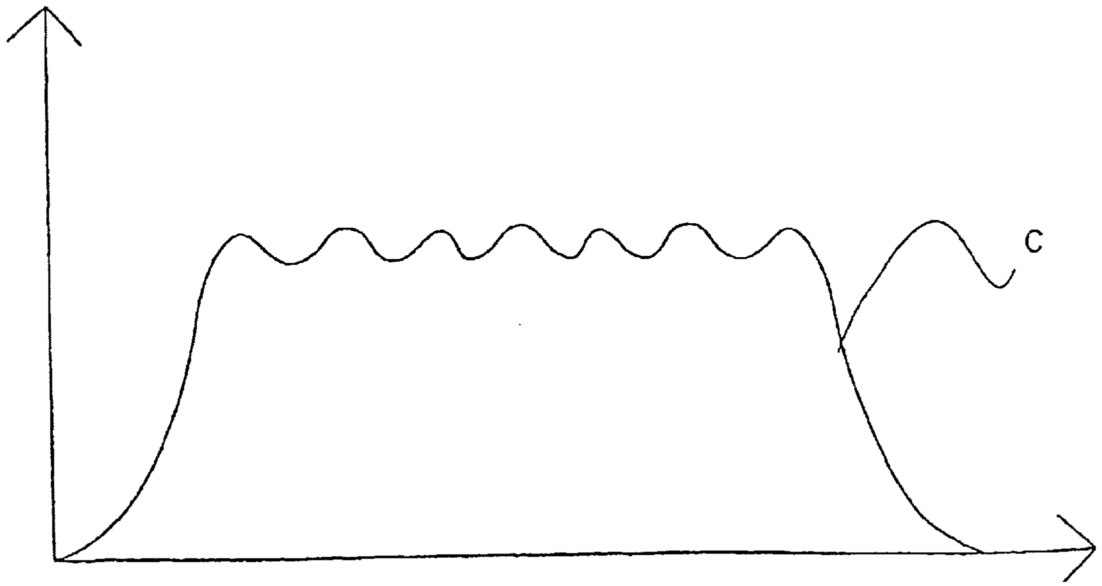

In FIG. 7*a* there is shown a channel/chamber structure 70 with a circular chamber with an inlet 71 and an outlet 72 channel. If it is important to avoid heating of the disc area surrounding the chamber, a heating element structure as shown in FIG. 7*b* can be employed, comprising concentric bands B1, b2 and a center spot c1. In this case the temperature profile will be the same in all cross sections through the center of the micro channel/chamber structure, and look something like the profile of FIG. 7*c*.

Figure 8A:
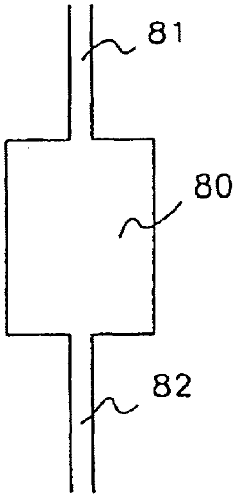
FIGS. 8*a–c* is a further embodiment implemented for another geometry.
Figure 8B:
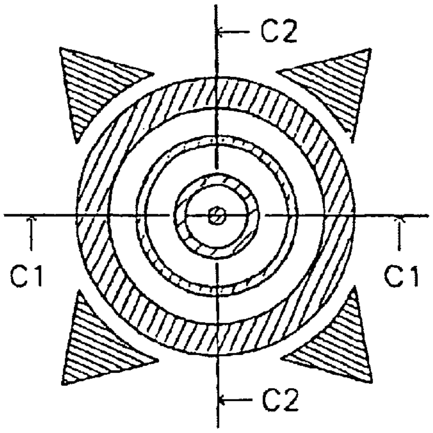
Figure 8C:
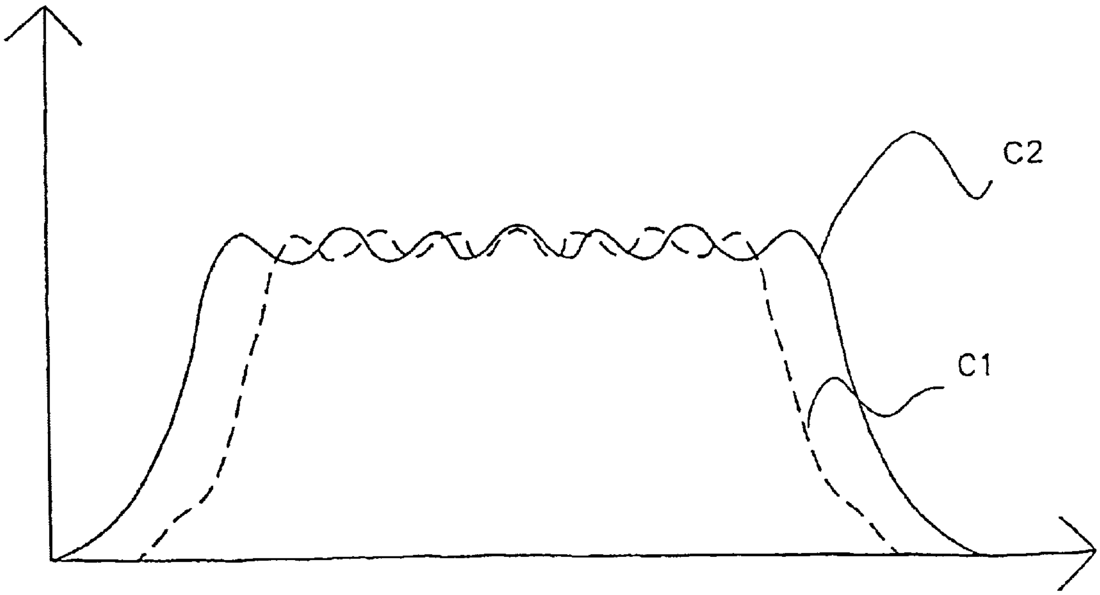

In FIGS. 8*a–c* a similar structure, but applied to a rectangular chamber is shown. FIG. 8*c* shows the temperature profiles C1, C2 in directions c1 and c2 of FIG. 8*b*, respectively.

For the illumination, lamps of relatively high power is used, suitably e.g. 150 W. Suitable lamps are of the type used in slide projectors, since they are small and are provided with a reflector that focuses the radiation used. The irradiation can be selected among UV, IR, visible light and other forms of light as long as one accounts for matching the substrate material and the absorbing layer properly. In case the lamp gives a desired wave-length band but in addition also wavelengths that cause heat production within the substrate it may be necessary to include the appropriate filter. Halogen lamps, e.g. can be used for selectively give visible light because that typically contains an IR-filter. In order to achieve the best results the light should be focussed onto the substrate corresponding to a limited region on the substrate, e.g. about 2 cm in diameter, although of course the size may be varied in relation to the power of the lamp etc. One or more lamps could be used in order to enable illumination of one or more regions, e.g. in the event it is desirable to carry out different reactions at different locations on a substrate On a rotating disc it might be desirable to perform heating at different radial locations. Illumination of the substrate can be from both sides. If the light absorbing material is deposited on the bottom side, nevertheless the illumination can be on the topside, in which case light is transmitted through the substrate before reaching the light absorbing material. Illumination of the backside with material deposited on the topside is also possible.

In view of the spinning speed of a rotating microfluidic disc being as high as of the order of 1000 rpm, the pulsing effect obtained in this way will not be noticeable and the heating can for all practical purposes be considered as continuous.

Figure 9A:
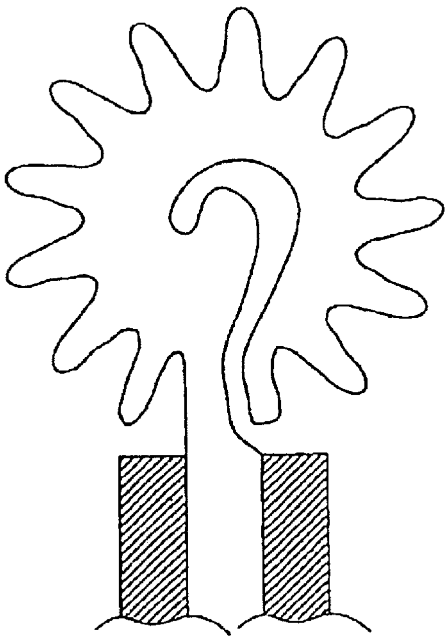
FIGS. 9*a–b* is embodiments of a resistive heating element structure.
Figure 9B:
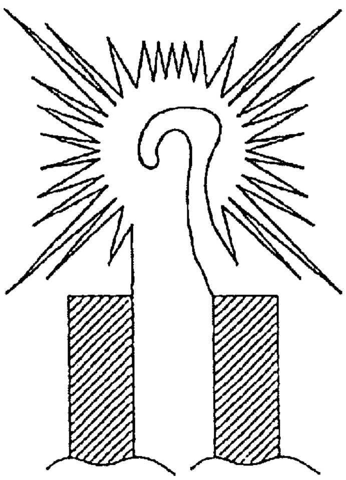

The above described embodiments have employed light absorbing material to provide the heating elements, but it is possible to employ any heating element structure in a suitable pattern that is capable of generating heat. Thus, it is also contemplated to provide areas of a resistive material 91, 92 in the same general lay-outs as shown in FIGS. 7–8. Examples thereof applied to the same channel structures as those in FIGS. 7–8 are shown in FIGS. 9*a*–*b*.

The patterns are applied e.g. by printing of ink comprising conductive particles, e.g. carbon particles mixed with a suitable binding agent, using e.g. screen printing techniques. Patterns functioning in the same way may also be created by the following steps (a) covering the surface of a substrate made of non-absorbing material with absorbing material and placing a reflective mask which contains patterns of holes or of non-absorbing material between the surface of the substrate and the source of the radiation with the individual patterns being aligned with the surfaces of the selected areas.

Another aspect that should be considered for the performance is the effect of cooling from the air flowing on the disc when it is rotated. Let us consider the configuration shown in FIG. 6 again. By the spinning action air will be forced radially outwards over the surface of the disc and will thereby cool the surface by absorbing some heat, such that the air is also heated. Thus, the air temperature will be higher towards the periphery of the disc, and the non-coated area between the bands of light absorbing material nearest the periphery will therefore not be as efficient in terms of decreasing the temperature as the non-coated/non-adsorbing area between the bands of light absorbing material closer the center.

In order to compensate for this phenomenon, the width of the non-coated areas can be larger nearer the periphery than the width of those nearer the center.

Normally the rotatable disc comprises a base portion having a top and a bottom side, on the topside of which said micro channel structure is provided, and on top of which a cover is provided so as to seal the micro channel structure. The heating elements (layer absorbing radiation energy) are preferably provided on the top surface so as to cover the selected area to be heated. However, said light absorbing layer can also, as an alternative, be provided on said bottom side.

In still another embodiment the heating element structures can be applied to stationary substrates, i.e. chip type devices. In case of stationary substrates it will be necessary to use forced convection, e.g. by using fans or the like to supply the necessary cooling. In all other respects the micro channel/chamber structures and heating structures can be identical.

Figure 10A:
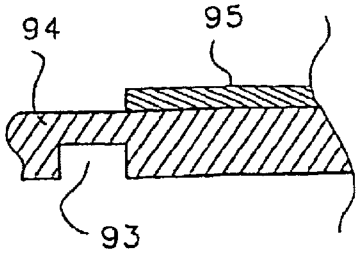
FIGS. 10*a–b* illustrates means for controlling the flanks of the temperature profile.
Figure 10B:
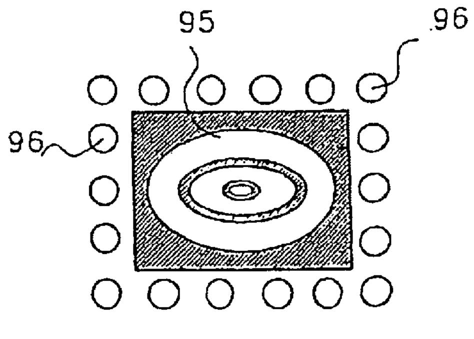

As mentioned above the flanks of the temperature profile exhibits a certain slope, which has as a consequence that an area surrounding the part of the micro channel structure that is to be heated, will also be heated. This is because the substrate material adjacent the region which is coated will dissipate heat from the area beneath the coating. One way of reducing this heat dissipation is to reduce the cross section for heat conduction. This can be done by providing a recess 93 in the substrate 94 on the opposite side of the coating 95 along the periphery of said coating as shown in FIG. 10*a*. In this way the resistance to heat being conducted away from the coated region will be increased. Another way to obtain a similar result is to provide holes 96 instead of said recess, but along the same line as said recess, as shown in FIG. 10*b*.

A particularly suitable application of the heating system in combination with the micro channel structures disclosed herein previously is for performing PCR (Polymerase Chain Reaction), an example of which will be given below with reference to FIG. 11.

Figure 11:
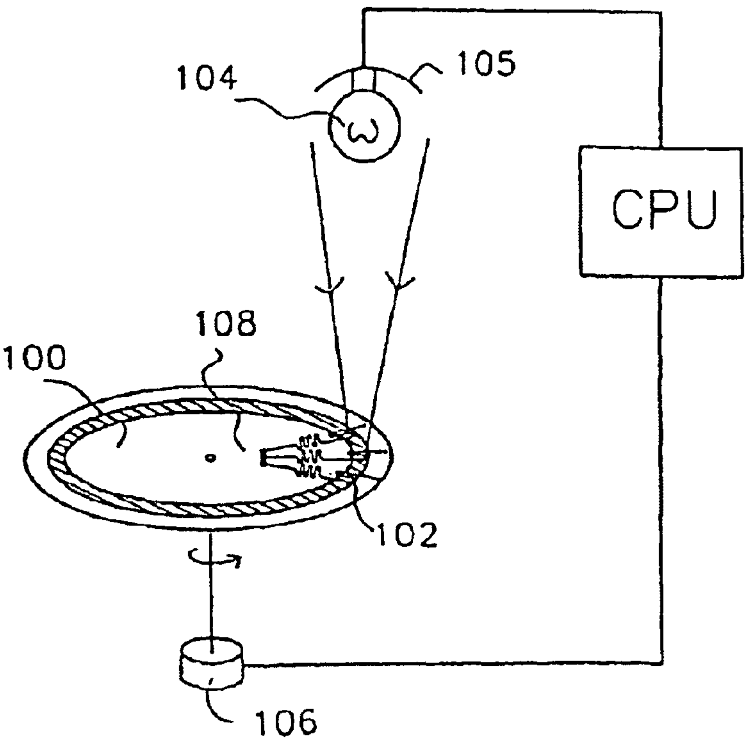
FIG. 11 shows a reactor system according to the invention for performing PCR.

Thus, in FIG. 11 there is illustrated a system for performing PCR in accordance with the present invention. The system comprises a control unit CPU for controlling the operation of the system; a rotatable 100 disc comprising a plurality of micro channel/chamber structures 102; a device for supplying heat to the channel/chamber structures (in the example the heat source is a lamp 104, but of course resistive heating as discussed herein is also possible); a reflector 105 for focussing the light onto the disc 100; a motor 106 for rotating said disc 100, the speed of rotation of which can be controlled by the control unit.

The disc is provided with a mask (see FIGS. 5*b*, 6*a*, 7*b*, 8*b* and related disclosure) to create a uniform temperature level across a selected area in which PCR reaction is to be performed, the selected pattern being dependent on the configuration of the channel/chamber system that will be used.

Figure 12:
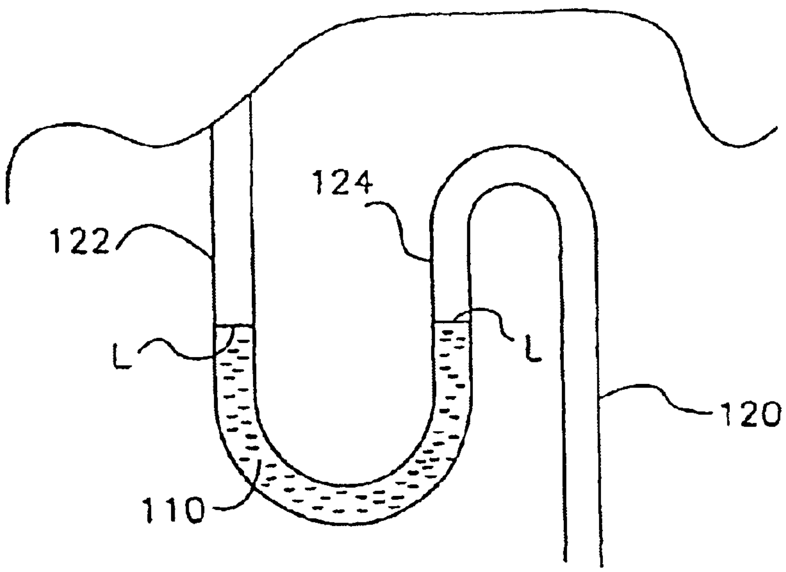
FIG. 12 is a detail view showing the part of a U configuration of a micro channel structure where the PCR is to be performed.

In a preferred embodiment of a PCR reactor according to the invention, a channel having a U configuration 120 of the type disclosed in FIG. 12 is used (this is essentially the same configuration as that of FIG. 2*a*). FIG. 12 only shows a part of the overall channel/chamber structure, namely that part in which the PCR is carried out. Thus, the reactor comprises a micro channel laid out as a U turn on the disc, having two legs, the legs having a generally radial extension. A first leg 122 will constitute an inlet portion, and a second leg 124 will constitute an outlet portion.

When it is desired to do a PCR, a sample is introduced into the channel system at point 108 near the center of the disc. Then the disc is spun whereby the sample 110 is transferred through the channel system down to the U turn where it will stay (the sample volume is defined by the two level indications L), by virtue of the U acting as a stop for further flow through the channel system.

The next step in the PCR procedure is to carry out a temperature cycling process, where it is important that the temperature is maintained constant and uniform within the reaction volume. This can be achieved by providing the disc with a mask element such as the one shown in FIG. 6*a*. Spinning the disc and illuminating with the lamp will then cause the temperature to increase to a desired level determined by the power of the lamp and the speed of rotation.

When it is desired to change the temperature from say 95° C. to 70° C., which is a common temperature jump, the control unit will reduce the power and the speed of the motor. With the system of the invention this temperature jump can be done in 3 seconds.

One further aspect of the invention is an instrument comprising a rotatable disc as defined in any of claims 27–29 and a spinner motor with a holder for the disc, said motor enabling spinning speeds that are possible to regulate. Typically the spinning of the motor can be regulated within an interval that typically can be found within 0–20 000 rpm. The instrumentation may also comprise one or more detectors for detecting the result of the process or to monitor part steps of the process, one or more dispensers for introducing samples, reagents, and/or washing liquids into the micro channel structure of the substrate together with means for other operations that are going to be performed within the instrument.

The invention will now be illustrated by way of an example.

EXAMPLE

A micro channel structure having a U configuration in a rotatable polycarbonate disc is used. The disc is prepared by fusing a polycarbonate film over the micro channel structures and painting the bottom side with a black pattern. The CD is spun and the black pattern is exposed to visible light from three150 W halogen lamps. The power of the lamps is varied using computer control (software LabView). The surface temperature is measured using an infrared camera.

A PCR mix is designed to generate a 160 bp product, the composition being given below.

| Component | Final conc./amount |
|---|---|
| PCR buffer (AP Biotech) | x1 |
| Ficoll 400 (AP Biotech) | 10% |
| Cresol Red | 0.2 mg/ml |
| dNTPs (AP Biotech) | 200 μM |
| Primers (RIT 29 and M13 Universal)* | 15 pmol |
| AmpliTaq (PEBiosystems) | 1 U |
| pUC19 Template (AP Biotech) | 250 ng |
| Total volume | 50 μl |

*RIT 29: 5'-Biotin-GCT TCC GGC TCG TAT GTT GTG TG

M13 Universal: 5'-Cy5-CGA CGT TGT AAA ACG ACG GCC AGT approximately 0,5 μl of the mix is introduced into the micro channel structure on the disc with a syringe. The program for thermocycling is as follows:

(95° C., 7 s; 70° C., 15 s)×20 or 25 cycles

After cycling the contents is ejected by suction and diluted with 5 μl Stop solution (Formamide containing blue dextran and 2 μl each of 100 bp and 200 bp size standards per 100 μl stop solution—ALFexpress reagents).

Positive controls are run by thermocycling 1 or 5 μl of the mix in 200 μl microreaction tubes in a Perkin Elmer 9600 Thermal cycler as follows:

(AUTO profile, 2 step; 95° C., 30 s; 70° C., 120 s)×30

Hold profile; 4° C.->∞

The Cy5-labelled PCR products are analyzed by separation on ReproGel High resolution in ALFexpress and analyzed using Fragment Analyzer 2.02.

Figure 13:
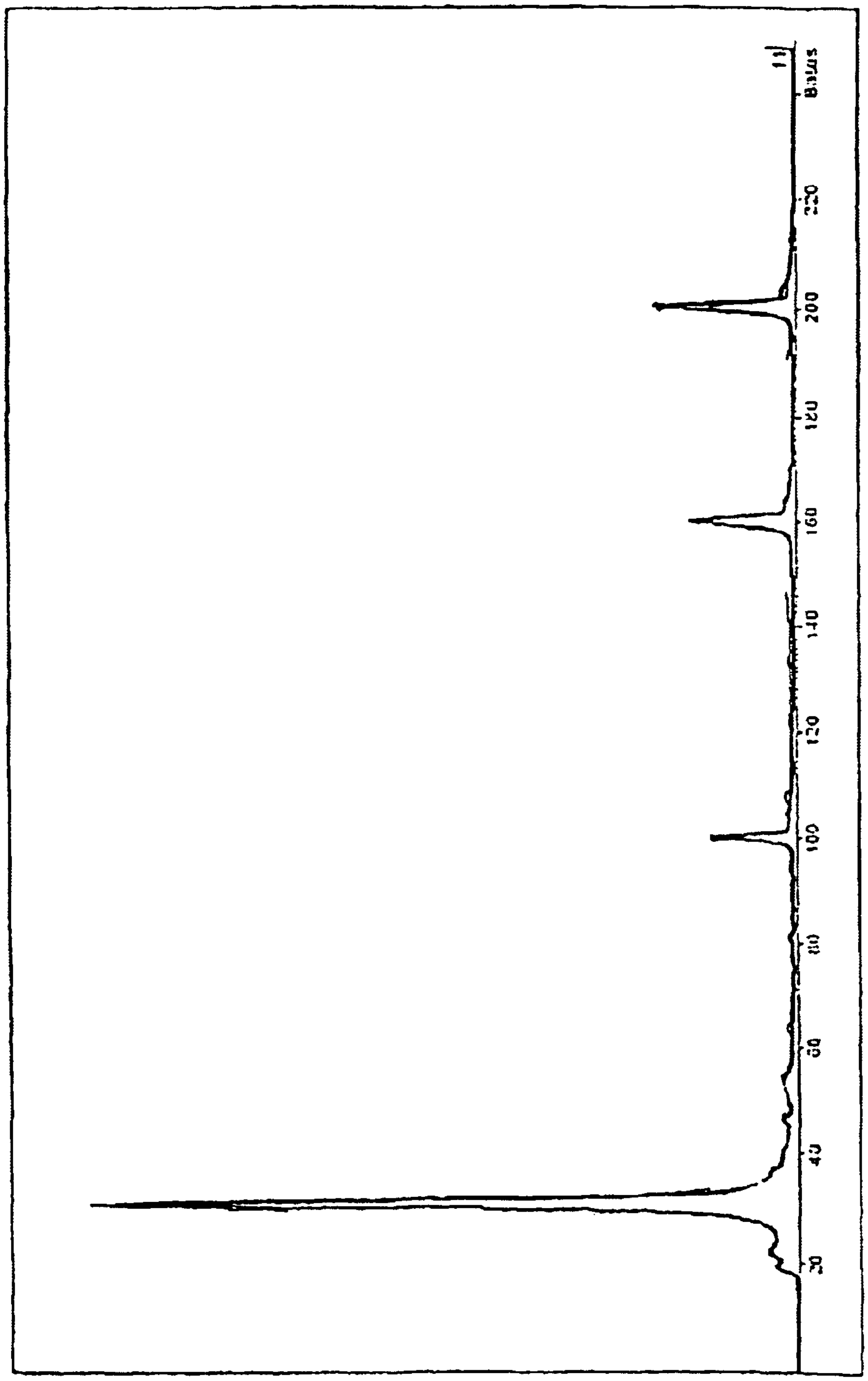
FIG. 13 illustrates the result of a PCR performed according to the invention.

In FIG. 13 the result of a PCR run performed in a PCR reactor according to the invention is shown. As can be clearly seen, a peak at 160 bp indicates that the reaction has been taking place, thus demonstrating the utility of the invention.

Although the invention has been described with reference to the drawings and an example, it should not be regarded as limited to the shown embodiments, the scope of the invention being defined by the appended claims. Thus, modifications and variations beyond the illustrated examples are within the scope of the claims.

What is claimed is:

1. A microchannel reactor apparatus for performing temperature cycling, comprising a substrate having at least one microchannel structure, the microchannel structure comprising one or more microchannels wherein (a) at least a portion of at least one of said microchannels constitutes a reaction volume for performing said temperature cycling; and (b) there is provided a heating structure defining i) a selected area on said substrate, including said reaction volume in which said temperature cycling is to be performed; and ii) a temperature profile in said reaction volume such that an essentially uniform temperature is obtainable and maintained in said reaction volume, said heating structure comprises a material capable of transferring heat into said selected area when energized, and said material is laid out in a pattern that causes heating and cooling to balance each other so as to create said uniform temperature in the reaction volume.

2. The microchannel reactor apparatus of claim 1 wherein said heating structure defines a continuous layer covering said selected area.

3. The reactor apparatus as claimed in claim 1 wherein the microchannel structure comprises at least one channel exhibiting a U turn, defining said reaction volume.

4. The reactor apparatus as claimed in claim 1 wherein the reaction volume is defined in a straight channel provided with a valve to prevent a sample from being moved in the channel beyond the reaction volume, said valve comprising a plug of a material that is capable of changing its volume in response to an external stimulus, wherein the external stimulus is light, heat, radiation, or magnetism.

5. The reactor apparatus as claimed in claim 4 wherein said plug material is selected from the group consisting of polymers, waxes and metals having low melting temperature.

6. The reactor apparatus as claimed in claim 1 wherein said material is capable of absorbing electromagnetic energy, and said electromagnetic energy is light.

7. The reactor apparatus as claimed in claim 1 wherein said heating structure comprises a separate member disposed so as to mask electromagnetic radiation directed towards the surface of the substrate, and having openings defining said pattern, and wherein the material capable of transferring heat into said selected area when energized is provided as a continuous layer covering said reaction volume.

8. The reactor apparatus as claimed in claim 1 wherein the material capable of transferring heat into said selected area when energized comprises a pattern of areas of a resistive material capable of generating heat when an electric current is passed therethrough.

9. The reactor apparatus as claimed in claim 1 wherein the portion constituting said reaction volume has an inlet end and an outlet end, and said reaction volume has the same cross section as the portions of said microchannel connecting to said reaction volume at both the inlet and the outlet end thereof.

10. The reactor apparatus as claimed in claim 1 wherein the substrate is a rotatable disc.

11. The reactor apparatus as claimed in claim 1 wherein the substrate is a stationary, non-rotary member.

12. A system for performing temperature cycling, comprising (a) a reactor apparatus as claimed in claim 1 having a substrate that is rotatable;

(b) a motor coupled to the reactor apparatus to enable rotation of the apparatus;

(c) a source of energy for heating said reactor apparatus; and (d) a control unit for controlling heating power and rotation of said reactor apparatus in accordance with a desired temperature cycling operation.

13. The system as claimed in claim 12, adapted for PCR.

14. A method for temperature cycling of a sample in a microchannel between a lower and a uniform elevated temperature, comprising the steps of (i) providing a microchannel reactor apparatus as defined in claim 1, (ii) filling at least one of said one or more reactor volumes with a liquid aliquot to be temperature cycled, (iii) supplying energy to the heating structure of the apparatus to reach said uniform elevated temperature, (iv) reducing the energy supply so as to reach said lower temperature, and (v) repeating steps ii) and iii) a desired number of times.

15. The method as claimed in claim 14, wherein the substrate is a disc and the disc is spun during temperature cycling, with an increased spinning speed during step (iv).

16. A method for temperature cycling of a sample in a microchannel between a lower and a uniform elevated temperature, comprising the steps of(i) providing a microchannel reactor apparatus as defined in claim 1, (ii) filling at least one of said one or more reactor volumes with a liquid aliquot to be temperature cycled, (iii) supplying energy to the heating structure of the apparatus to reach said uniform elevated temperature, (iv) reducing the energy supply so as to reach said lower temperature, and (v) repeating steps ii) and iii) a desired number of times a system for performing temperature cycling, comprising (a) a reactor apparatus as claimed in claim 1 having a substrate that is rotatable, (b) a motor coupled to the reactor apparatus to enable rotation of the apparatus; (c) a source of energy for heating said reactor apparatus; and (d) a control unit for controlling heating power and rotation of said reactor apparatus in accordance with a desired temperature cycling operation, wherein the apparatus provided in step (i) is part of a system for performing temperature cycling, comprising (a) a reactor apparatus having a substrate that is rotatable, (b) a motor coupled to the reactor apparatus to enable rotation of the apparatus; (c) a source of energy for heating said reactor apparatus; and (d) a control unit for controlling heating power and rotation of said reactor apparatus in accordance with a desired temperature cycling operation.

17. A microchannel PCR reactor apparatus, comprising:

(a) a substrate in the form of a transparent, rotatable disc, having a microchannel structure comprising a plurality of microchannels, provided therein, wherein at least a portion of one of said microchannels constitutes a reaction volume for performing PCR;

(b) a layer of a material capable of absorbing electromagnetic energy and capable of transferring heat into said selected area when energized, said layer provided so as to cover at least an area within which said reaction volume is confined; wherein said portion of one of said microchannels that constitutes a reactor volume is shaped as a U having an inlet end and an outlet end, and said material is laid out in a pattern of coated and intermediate non-coated areas over said reaction volume, said pattern defining a desired and uniform temperature in the reaction volume.

18. The reactor apparatus as claimed in claim 1, wherein the pattern is annular.

* * * * *